Nov. 24, 1964   H. D. TARPINIAN   3,158,737
ELECTRO-MECHANICAL VALUE-AVERAGING INSTRUMENT
Filed Jan. 30, 1962
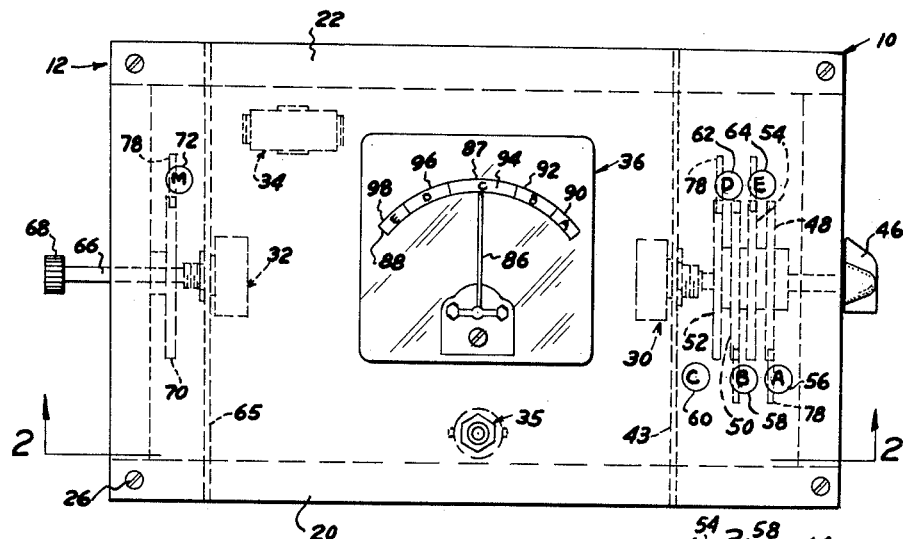
FIG. 1
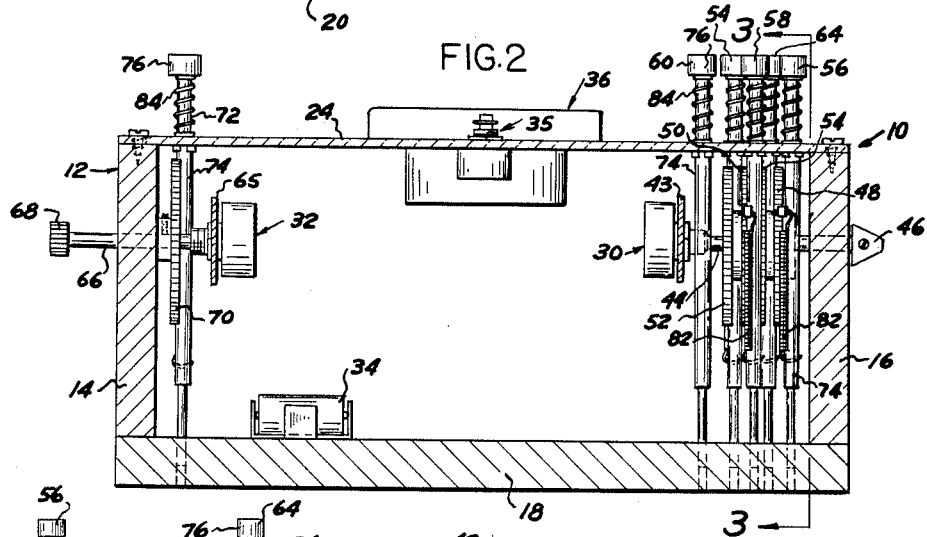
FIG. 2
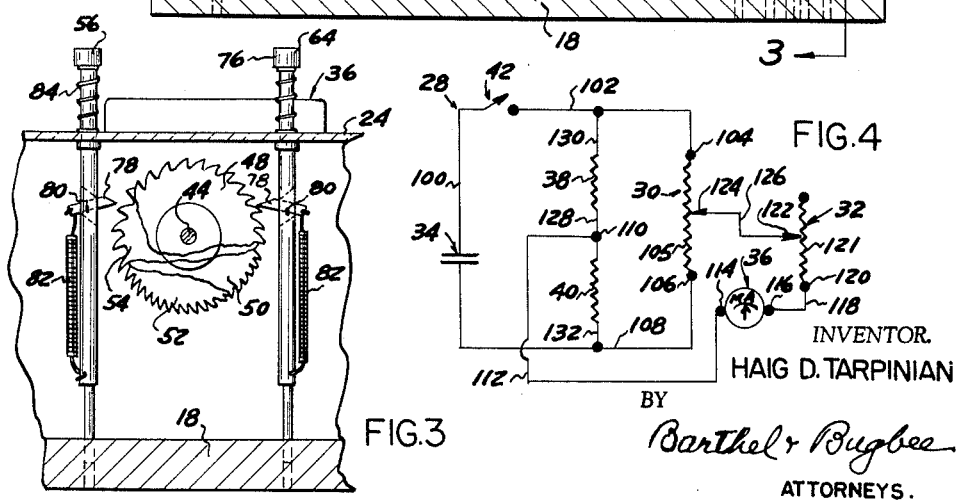
FIG. 3
FIG. 4
INVENTOR.
HAIG D. TARPINIAN
BY
Barthel & Bugbee
ATTORNEYS.

United States Patent Office 3,158,737
Patented Nov. 24, 1964

3,158,737
ELECTRO-MECHANICAL VALUE-AVERAGING
INSTRUMENT
Haig D. Tarpinian, 1244 Bishop Road,
Grosse Pointe Park 30, Mich.
Filed Jan. 30, 1962, Ser. No. 169,881
7 Claims. (Cl. 235—179)

This invention relates to averaging devices or instruments and, in particular, to electro-mechanical averaging devices or instruments.

One object of this invention is to provide an electro-mechanical value averaging device or instrument by means of which an operator can average a large number of values, such as student grades, in a short time, without the necessity of making any computations and without danger of error, merely by mechanically depressing the keys or plungers of the averaging device and reading the resulting average value off a meter.

Another object is to provide a value-averaging device of the foregoing character wherein the keys or plungers actuate an electrical circuit which in turn indicates the final mean or average value of an electrically-operated meter.

Another object is to provide a value-averaging device according to the object immediately preceding wherein the keys or plungers perform different adjustments on the resistors or potentiometers of an electrical circuit according to the different values being averaged, with the final mean or average value proportional to the resulting current through the circuit to an indicating meter such as a milliammeter, the deflection of the needle of which indicates the final mean or average grade.

Other objects and advantages of the invention will become apparent during the course of the folowing description of the accompanying drawing, wherein:

FIGURE 1 is a top plan view of an electro-mechanical value-averaging device, according to one form of the invention, showing the electrical and mechanical components but omitting the electrical circuit wiring in order to simplify the disclosure;

FIGURE 2 is a vertical section taken along the line 2—2 in FIGURE 1, immediately inside the front wall of the casing, showing the electrical and mechanical components in side elevation;

FIGURE 3 is a vertical cross-section taken along the line 3—3 in FIGURE 2, with the four ratchet wheels successively broken away to indicate their particular relative sizes and directions of ratchet teeth; and FIGURE 4 is a wiring diagram of the electrical circuit of the electro-mechanical grade averaging device of FIGURES 1 to 3 inclusive.

Referring to the drawing in detail, FIGURES 1 and 2 show a value averaging device, generally designated 10, mounted in a box-like casing 12 having opposite end walls 14 and 16, a bottom wall 18 and front and rear walls 20 and 22 respectively. The casing 12 is completed by a top wall 24 which is removably secured by fasteners 26 and which, for convenience, is shown as transparent so as to disclose the components beneath it. The case 12 contains the electrical components set forth below and electrically interconnected in an electrical value-averaging circuit 28 shown in FIGURE 4. Certain of the components are constructed and arranged to be operated mechanically in the manner also set forth below.

Included in the electrical value-averaging circuit 28 are a totalizing potentiometer 30, an averaging variable resistor 32, a battery or dry cell 34, such as an ordinary flashlight cell, and an average value-indicating meter, such as a milliammeter 36 which has its needle resting at midscale in its zero position. Also provided are two fixed resistors 38 and 40, preferably of equal resistances, arranged in series, and a switch 42, such as a push-button switch. These electrical components are interconnected in the circuit 28 in the manner described below.

The totalizing potentiometer 30 is mounted on a cross member 43 extending between the front and rear walls 20 and 22. The potentiometer 30 is of a rotary type operated by a rotary shaft 44 passing through the right-hand end wall 16 of the casing 12 and carrying a zero-izing operating knob 46. Also mounted on the shaft 44 to rotate unitarily therewith are four ratchet wheels 48, 50, 52 and 54. The ratchet wheels 48 and 54 have half the number of teeth as the ratchet wheels 50 and 52. Looking inward from the right-hand end wall 16 of the case 12 (FIGURE 3), the coarse-toothed first ratchet wheel 48 has its teeth inclined clockwise relatively to its radii, so that when pawl-actuated, it moves the shaft 44 counterclockwise by large steps, whereas the coarse-toothed second ratchet wheel 54 has its teeth inclined counter-clockwise relatively to its radii so that when pawl-actuated, it moves the shaft 44 clockwise by large steps. Similiarly, the fine-toothed third ratchet wheel 50 has its teeth inclined clockwise relatively to its radii so that, when pawl-actuated, it rotates the shaft 44 counterclockwise by small steps amounting to half the step or rotational angle of its corresponding coarse-toothed ratchet wheel 48. The fine-toothed fourth ratchet wheel 52 has its teeth inclined counterclockwise relatively to its radii, so that when pawl-actuated, it rotates the shaft 44 clockwise by small steps also amounting to half the step or rotational angle of its corresponding coarse-toothed ratchet wheel 54.

The four ratchet wheels 48, 50, 52 and 54 are rotated by spring-pressed pawl-equipped plungers or keys 56, 58, 62 and 64 respectively which in turn are marked A, B, D and E for the corresponding different values, such as student grades, so designated. A fifth or additional spring-pressed "dummy" plunger 60 is also provided and marked "C" for another still different value, such as the corresponding school grade "C." The plunger 60 is not pawl-equipped and operates no ratchet wheel, hence produces no rotation of the shaft 44 and consequently makes no adjustment of, and has no effect upon the totalizing potentiometer 30. The plunger 60 is provided for the convenience of the operator, as it relieves him from performing errors in operation by forgetting to make allowance for "C" grades in the manner explained below in connection with the operation of the invention.

The averaging variable resistor 32 is also of a rotary type and is also mounted upon a cross member 65 extending between the front and rear walls 20 and 22 of the casing 12. The averaging variable resistor 32 is operated by a rotary shaft 66 which extends through the left-hand end wall 14 and carries a zero-izing knob 68. Mounted on the shaft 66 for rotation unitarily therewith in one direction, such as clockwise when looking in the same direction as the section lines 3—3 in FIGURE 2, namely from the right-hand end wall 16 of the casing 12 toward the left-hand end wall 14 thereof, is a ratchet wheel 70 having its teeth angled or inclined counterclockwise or rearwardly relatively to its radii when so viewed. The ratchet wheel 70 is operated in a clockwise direction, viewed from right to left as explained above, by a pawl-equipped spring-pressed plunger 72 marked "M" for "mean" grade or the average value of grade of the student being graded.

As a basis for the operation of the device, to average the above-explained five different pre-assigned values, such as school grades of A, B, C, D and E, these five values are given quantities as follows:

A equals plus 2
B equals plus 1
C equals zero
D equals minus 1
E equals minus 2

These quantities correspond to the angular increments imparted in a positive or counterclockwise direction of rotation of the shaft 44 or in a negative or clockwise rotation of the shaft 44. In other words, the numbers and their signs indicate the number of steps for each actuation of a particular key or plunger that the shaft 44 will be rotated in the step-by-step actuation of the totalizing potentiometer 30. The manner in which this is accomplished is clarified in the description of the operation of the device or instrument 10.

As indicated by their names, each of the spring-pressed pawl-equipped plungers or keys 56, 58, 62 and 64 consists of a vertically-reciprocable rod 74 (FIGURES 2 and 3) journaled for reciprocation in the top and bottom walls 24 and 18 respectively of the instrument casing 12. Each plunger or key is provided at its upper end with a button 76 adapted to be pressed downward by a finger of the operator, and the top of each button 76 bears the pre-assigned value or school grade designation A, B, D or E mentioned above. Each of the rods 74 carries a pawl 78 pivoted thereto as at 80 and urged in one direction by a tension spring 82 (FIGURE 3) so as to enable it to slide or "click" over the teeth of its corresponding ratchet wheel in one direction of rotation thereof but to engage and rotate the ratchet wheel in the opposite direction. Each rod 74 is urged upward by a compression spring 84. The dummy plunger or key 60, the button 76 of which is designated with the pre-assigned value or school grade "C," carries no pawl since it operates no ratchet wheel but is otherwise the same as the other plungers or keys 56, 58, 62 and 64 and is similarly urged upward by a helical compression spring 84.

The average value-indicating meter 36, which is ordinarily a milliammeter, is provided with the usual needle 86 adapted to swing in opposite directions from its zero position mark 87 located at the center of an arcuate scale 88 graduated in arcuate sections 90, 92, 94, 96 and 98 corresponding to the average or mean values such as student grades A, B, C, D and E respectively.

In the electrical value-averaging circuit 28, the dry cell or other battery 34 is connected by the line 100 (FIGURE 4) to the push-button switch 42, from which the line 102 runs to one terminal 104 of the resistance element 105 of the totalizing potentiometer 30, from the opposite terminal 106 of which the line 108 returns to the opposite terminal of the battery or dry cell 34. From the mid-terminal 110 between the fixed resistors 38 and 40, the line 112 runs to one terminal 114 of the average value indicating meter 36. Running from the opposite terminal 116 of the meter 36 is a line 118 extending to one terminal 120 of the resistance element 121 of the value-averaging variable resistor 32, the opposite end terminal of which remains free or unconnected. Running from the slider or movable voltage pick-off arm 122 of the variable resistor 32 to the corresponding slider or voltage pick-off arm 124 of the totalizing potentiometer 30 is a line 126. The adjacent ends of the fixed resistors 38 and 40 nearest to their mid-terminal 110 are connected to one another by the line 128, and their remote ends are connected to the lines 102 and 108 by the lines 130 and 132 respectively.

The operation of the invention is most clearly indicated by performing a particular example, in connection with the explanation already given as to the value designations of the plungers or keys 56, 58, 60, 62 and 64. Let it be assumed, for example, that the values to be averaged constitute the grades of a particular student comprising five A's, three B's and two C's. Prior to operating the various plungers, the operator sets the instrument 10 at zero by setting the needle 86 of the milliammeter 36 at the zero midposition on its arcuate scale 88. This he does by first adjusting the averaging potentiometer 32 to zero by turning its knob 68 backward or counterclockwise, looking from right to left in FIGURES 1 and 2, namely in the direction of the section line 3—3, until the slider 122 is nearest the end tap 118, so that no resistance is introduced by it into the circuit 28. The operator then adjusts the totalizing potentiometer as nearly as possible to its zero midposition of its slider 124 by turning its zero-izing knob 46 to register as nearly as possible to a previously-inscribed zero mark (not shown) on the end wall 16 of the casing 12. Having taken these precautions, the operator then depresses the push button switch 35 momentarily, causing the milliammeter needle 86 to swing off center if adjustment to zero position 87 has not been exactly reached, i.e. if any appreciable current is reaching the milliammeter 36. If the needle 86 shows a deflection from its zero or midposition 87 on the arcuate scale 88, the operator moves the knob 46 slightly backward or forward while maintaining the switch 35 closed, until the needle 86 of the meter or milliammeter 36 comes to rest exactly at its zero or midposition mark 87 on the arcuate scale 88, which is of course the midpoint of the "C" section 94 of the scale 88.

With the instrument 10 thus accurately set to its zero or "null" position, the operator now depresses the button 76 of the "A" grade plunger 56 five times, corresponding to the five "A" grades of the student, then depresses the "M" averaging plunger 72 the same number of times, in this instance five times. Since the student in the particular example has three "B" grades, the operator next depresses the "B" grade plunger 58 three times, and as before immediately afterward depresses the "M" averaging plunger 72 three times. Since the particular student has two "C" grades, the operator depresses the "C" plunger 60 twice and immediately afterward depresses the "M" averaging plunger 72 twice. The depressing of the "C" plunger 60 produces no electrical effect but renders the operation of the instrument uniform, since the "C" grade has been assigned a zero or null value, as explained above and hence the depression of the "C" plunger 60 produces no rotation of the shaft 44 and consequently no variation of the setting of the totalizing potentiometer 30. Finally, the operator depresses the switch 15, causing the unbalanced electric current from the dry cell or battery 34, if any such current exists, to deflect the needle 86 of the meter 36 so that it comes to rest upon a particular grade space 90, 92, 94, 96 or 98 of the arcuate scale 88. In this particular example, the needle 86 comes to rest in the "B" grade section 92 of the arcuate scale 88 of the meter 36.

A numerical check shows this to be accurate, as follows:

5 A's times plus 2 equals plus 10
3 B's times plus 1 equals plus 3
2 C's times zero equals 0
—
Total          plus 13

Plus 13 divided by 10 equals plus 1.3 which corresponds to a "B" grade, according to the previous table of values. The number 10 is used as a divisor because there are ten grades to be averaged.

Mechanically, the above operation has caused ten counterclockwise steps or increments of rotation of the potentiometer shaft 44 by the five strokes of the A plunger for the five A's, and three steps counterclockwise for the three B grades, with no motion at all for the two depressions of the "C" plunger. If there had been D or E grades producing negative increments of rotation, the potentiometer shaft 44 would have been moved one or two steps or increments respectively in an opposite or clockwise direction for each such grade, reducing the total rotation of the potentiometer shaft 44 from its zero position.

The principle of operation of the value-averaging instrument is as follows: The voltage drop across the terminals 104 and 106 of the resistance element 105 of the totalizing potentiometer 30 is approximately the voltage drop across the voltage source of the battery 34, not including the voltage drop due to the resistance of the intervening conductors. The voltage at the potentiometer slider or pick-off member 124 is proportionate to the amount that the pick-off member 124 has moved forward or backward along the potentiometer resistance element 105. The reading of the meter needle 86 upon its graduated scale 88 is proportional to the current through the variable averaging resistor 32, which in turn is proportional to the voltage across the portion of its resistance element 121 between its slider or pickoff member 122 and its end terminal 120.

Let V equal the voltage at the slider 124 which is proportional to the sum of the digits representing the various values, a forward motion being considered positive and a backward motion negative;

Let M equal the reading of the meter 36, which is proportional to the current reaching it through the variable averaging resistor 32;

Let R equal the resistance produced by unit travel of the slider 124 of the totalizing potentiometer 30;

Let N equal the number of digits in the sum;

Whereupon M equals $V/NR$.

It will be evident that the instrument 10 of the present invention may also be used to average a number of numerical values other than student grades by reason of the fact that the school grades A, B, C, D and E chosen for purposes of illustration represent corresponding ranges of numerical grade performance, either on the zero to 100 percent scale widely used or on the zero to 4.0 scale used in the United States Navy and other armed services and, to a considerable extent, in academic institutions. In such instance, the arcuate scale 88 would be graduated directly in numerical values and the resulting average or mean value read off directly. It will also be evident that by adding still coarser or finer toothed ratchet wheels so as to impart three or more steps or increments in opposite directions for each operation of two or more additional pawl-equipped plungers, the range of the instrument 10 may be increased. In other words, the range of the value-averaging instrument 10 may be still further increased by the use of ratchet wheels giving four steps of rotation for the potentiometer shaft 44, or five steps or more depending upon the range intended to be covered by the instrument. In this manner, for example, the range of the instrument 10 may also be increased to average fractional grades such as A plus, A minus, B plus, B minus and so forth.

It will also be evident that in place of a rotary totalizing potentiometer 30 or rotary averaging variable resistor 32, a linearly-movable potentiometer or variable resistor respectively may be used. In such instance, the steps of motion imparted, for example, by pawls engaging linear racks rather than arcuate ratchet wheels will perform linear motion of the potentiometer or variable resistor slider along its respective resistance element, the potentiometer slider, as before, being movable in either of two opposite directions from its null or zero point.

What I claim is:

1. An electro-mechanical value-averaging instrument for ascertaining the average of a multiplicity of quantities wherein each quantity represents one of a series of different pre-assigned values, said instrument comprising
   an electrical circuit adapted to be connected to a voltage source and including
       a totalizing potentiometer having a first resistance element connected across said voltage source and also having a first voltage pickoff member selectively movable intermittently step-by-step along said first resistance element for picking off therefrom a portion of the voltage drop thereacross,
   a current-indicating meter having an indicating meter having an indicating scale graduated in said average values and having first and second connection terminals,
   bridging resistor means connected across said voltage source,
       said first terminal of said meter being connected to said bridging resistor means intermediate the connections of said resistor means to said voltage source,
   an averaging variable resistor having a second resistance element connected at one end to said second meter terminal,
       said averaging variable resistor having a second voltage pickoff member selectively movable intermittently step-by-step along said second resistance element and electrically connected to said first voltage pickoff member;
   means for intermittently moving said first voltage pickoff member step-by-step in steps of predetermined fixed magnitudes of resistance forward and backward along said first resistance element, each such first voltage pickoff step spanning a resistance magnitude corresponding to one of said pre-assigned values,
   and means for intermittently moving said second voltage pickoff member along said second resistance element,
       each such second voltage pickoff step also spanning a resistance magnitude corresponding to one of said pre-assigned values.

2. An electro-mechanical value-averaging instrument, according to claim 1, wherein said bridging resistor means contains a pair of resistance components connected in series with one another, and
   wherein said first meter terminal is connected to said bridging resistor means between said resistance components.

3. An electro-mechanical value-averaging instrument for ascertaining the average of a multiplicity of quantities wherein each quantity represents one of a series of different preassigned values, said instrument comprising
   an electric circuit adapted to be connected to a voltage source and including
       a totalizing potentiometer having a first resistance element connected across said voltage source and also having a first voltage pickoff member selectively movable step-by-step along said first resistance element for picking off therefrom a portion of the voltage drop thereacross,
   a current-indicating meter having an indicating scale graduated in said average values and having first and second connection terminals,
   bridging resistor means connected across said voltage source,
       said first terminal of said meter being connected to said bridging resistor means intermediate the connections of said resistor means to said voltage source,
   an averaging variable resistor having a second resistance element connected at one end to said second meter terminal,
       said averaging variable resistor having a second voltage pickoff member selectively movable step-by-step along said second resistance element and electrically connected to said first voltage pickoff member;
   means for moving said first voltage pickoff member in steps of predetermined fixed magnitude of resistance step-by-step forward and backward along said first resistance element,
    each such first voltage pickoff step spanning a resistance magnitude corresponding to one of said preassigned values,
and means for moving said second voltage pickoff member step-by-step in steps of predetermined fixed magnitudes along said second resistance element,
    each such second voltage pickoff step also spanning a resistance magnitude corresponding to one of said pre-assigned values,
    one of said voltage pickoff member moving means including a plurality of pawl and ratchet mechanisms,
        each mechanism actuating said pickoff member a predetermined number of steps in amount and direction corresponding to one of said pre-assigned values.

4. An electro-mechanical value-averaging instrument, according to claim 3, wherein said one voltage pickoff member moving means also includes a manually-movable actuating member operatively connected to each pawl and ratchet mechanism.

5. An electro-mechanical value-averaging instrument, according to claim 4, wherein said instrument also includes a manually-movable dummy actuating member free from connection to any of said pawl and ratchet mechanisms and also assigned a different value from the values assigned to the other actuating members.

6. An electro-mechanical value-averaging instrument, according to claim 3, wherein said ratchet mechanisms of said one voltage pickoff member moving means include rotary ratchet wheels and
    wherein said last-mentioned moving means includes a rotary shaft carrying said ratchet wheels and operatively connected to said one voltage pickoff member.

7. An electro-mechanical value-averaging instrument, according to claim 6, wherein certain of said ratchet wheels have ratchet teeth constructed and arranged to rotate said shaft in one direction in response to engagement by their respective pawls and wherein others of said ratchet wheels have ratchet teeth constructed and arranged to rotate said shaft in the opposite direction in response to engagement by their respective pawls.

References Cited in the file of this patent

UNITED STATES PATENTS

| 2,271,508 | Gordon | Jan. 27, 1942 |
| 2,476,384 | Razek | July 19, 1949 |

FOREIGN PATENTS

| 351,413 | Great Britain | June 15, 1931 |